United States Patent
Smith

(10) Patent No.: US 9,400,989 B2
(45) Date of Patent: Jul. 26, 2016

(54) SYSTEMS AND METHODS FOR LIVING USER REVIEWS

(71) Applicant: CBS Interactive Inc., San Francisco, CA (US)

(72) Inventor: Aaron Smith, Portland, OR (US)

(73) Assignee: CBS Interactive Inc., San Francisco, CA (US)

( * ) Notice: Subject to any disclaimer, the term of this patent is extended or adjusted under 35 U.S.C. 154(b) by 280 days.

(21) Appl. No.: 13/863,080

(22) Filed: Apr. 15, 2013

(65) Prior Publication Data

US 2013/0275554 A1  Oct. 17, 2013

Related U.S. Application Data

(63) Continuation of application No. 12/579,383, filed on Oct. 14, 2009, now abandoned.

(51) Int. Cl.
    *G06Q 30/02*    (2012.01)
    *G06Q 30/00*    (2012.01)
    *G06Q 10/04*    (2012.01)
    *G06Q 40/00*    (2012.01)

(52) U.S. Cl.
    CPC ............ *G06Q 30/0281* (2013.01); *G06Q 10/04* (2013.01); *G06Q 30/00* (2013.01); *G06Q 30/02* (2013.01); *G06Q 40/00* (2013.01)

(58) Field of Classification Search
    None
    See application file for complete search history.

(56) References Cited

U.S. PATENT DOCUMENTS

| | | | |
|---|---|---|---|
| 5,922,045 A * | 7/1999 | Hanson | H04M 3/493 709/203 |
| 6,641,037 B2 | 11/2003 | Williams | |
| 6,748,449 B1 * | 6/2004 | Dutta | G06F 17/30899 707/999.01 |
| 7,149,980 B1 | 12/2006 | Nelson et al. | |
| 7,433,832 B1 * | 10/2008 | Bezos | G06Q 10/10 705/26.8 |
| 7,543,005 B1 | 6/2009 | Edelman et al. | |
| 7,958,010 B2 * | 6/2011 | Huang | G06F 17/30864 705/26.7 |
| 8,051,074 B2 * | 11/2011 | Eom | G06F 17/211 707/722 |
| 8,635,267 B2 * | 1/2014 | Schmidt | G06Q 30/02 709/201 |
| 2002/0143608 A1 * | 10/2002 | Brown | G06Q 10/06 705/7.25 |
| 2005/0251409 A1 * | 11/2005 | Johnson | G06Q 30/02 705/343 |
| 2007/0027830 A1 | 2/2007 | Simons et al. | |

(Continued)

OTHER PUBLICATIONS

United States Patent and Trademark Office, U.S. Appl. No. 12/579,383, Examiner's Answer to Appeal Brief, mailed Mar. 14, 2012, 9 pages.

(Continued)

*Primary Examiner* — Ranodhi Serrao
*Assistant Examiner* — James Fiorillo
(74) *Attorney, Agent, or Firm* — Fenwick & West LLP

(57) ABSTRACT

Systems and methods for creating an opinion timeline. Users are able to submit ongoing reviews for products and services based on extended use, new revelations, additional features, upgrades and the like. Users can be notified of upgrades or improvements and are requested to provide another review of the product or service which is tied to the original review. Users can also update their review of the product or service based on a change in mind. The opinion timeline can be applied to reviews of products, television shows, music, etc.

14 Claims, 7 Drawing Sheets

(56) References Cited

U.S. PATENT DOCUMENTS

| | | | | |
|---|---|---|---|---|
| 2007/0168216 A1* | 7/2007 | Lemelson | ............... | G06Q 30/00 705/26.1 |
| 2007/0186006 A1* | 8/2007 | Murray | ................ | H04H 20/106 709/231 |
| 2008/0097835 A1* | 4/2008 | Weiser | ................... | G06Q 30/02 705/306 |
| 2009/0030801 A1* | 1/2009 | Meggs | ................... | G06Q 30/02 705/14.39 |
| 2009/0070228 A1* | 3/2009 | Ronen | ................ | G06Q 30/0603 705/26.1 |
| 2009/0112892 A1* | 4/2009 | Cardie | .............. | G06F 17/30719 |
| 2009/0210444 A1* | 8/2009 | Bailey | ................... | G06Q 30/02 |
| 2010/0088154 A1* | 4/2010 | Vailaya | ................. | G06Q 10/04 705/7.29 |
| 2010/0185616 A1* | 7/2010 | Baran | .................... | G06Q 30/02 707/736 |
| 2011/0087737 A1 | 4/2011 | Smith | | |
| 2013/0226758 A1* | 8/2013 | Reitan | .................... | G06Q 40/00 705/35 |
| 2014/0195387 A1* | 7/2014 | Gopinath | ........... | G06Q 30/0641 705/27.1 |

OTHER PUBLICATIONS

United States Patent and Trademark Office, U.S. Appl. No. 12/579,383, Final Office Action, mailed May 27, 2011, 9 pages.

United States Patent and Trademark Office, U.S. Appl. No. 12/579,383, Non-Final Office Action, mailed Dec. 29, 2010, 8 pages.

United States Patent and Trademark Office, U.S. Appl. No. 12/579,383, Patent Board Decision, mailed Mar. 14, 2013, 25 pages.

* cited by examiner

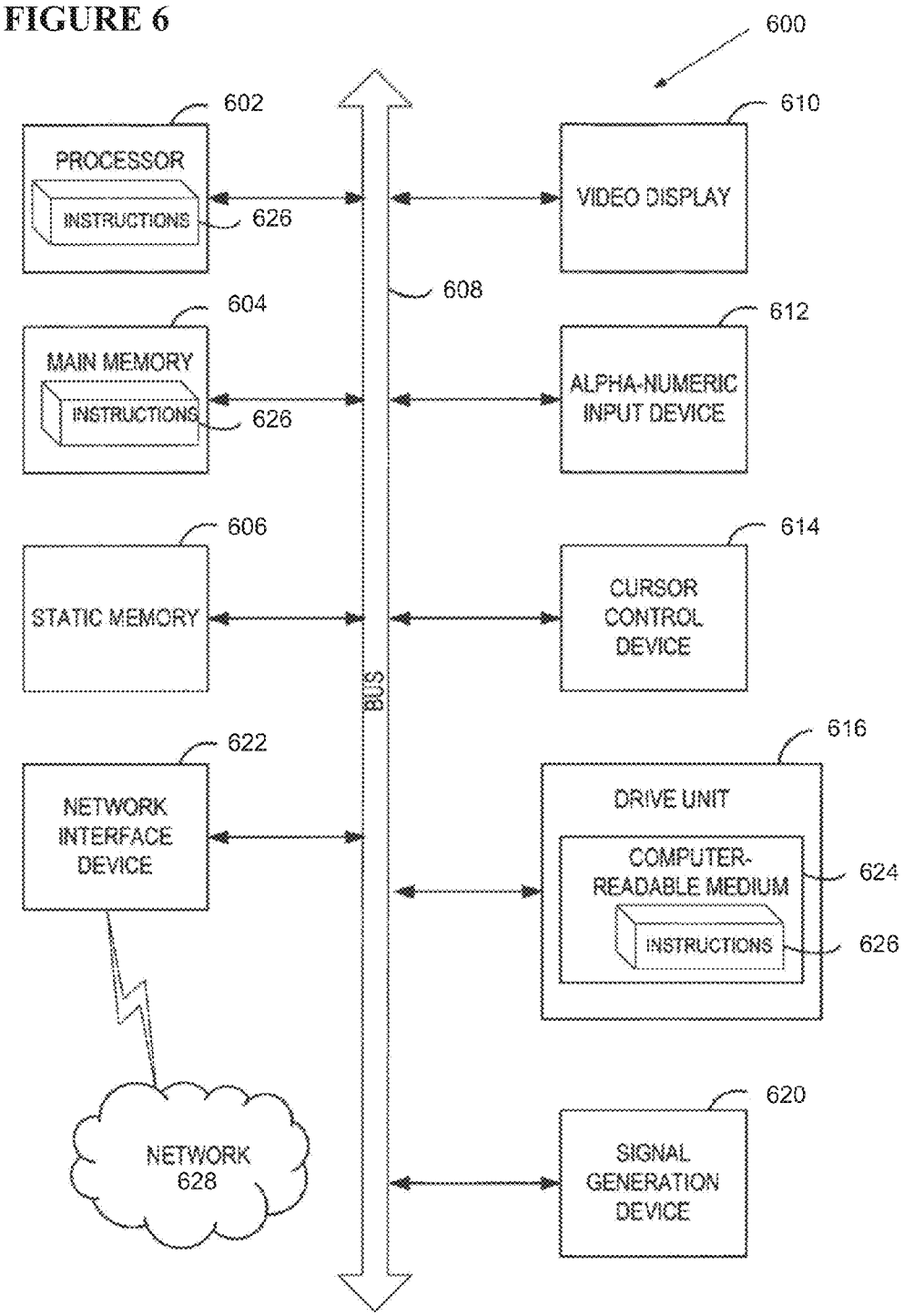

SYSTEMS AND METHODS FOR LIVING USER REVIEWS

This application is a continuation of application Ser. No. 12/579,383, filed on Oct. 14, 2009, the contents of which are incorporated herein by reference.

BACKGROUND

1. Field

The subject invention relates to systems and methods for updating user reviews and, in particular, to systems and methods for creating an opinion timeline.

2. Related Art

The Internet is used for retailers to offer products and services that they are selling and for consumers to purchase those products and services. Many of these sites allow users to review the products they have purchased and/or services that they have used. Independent sites, sites that do not retail the products and services being reviewed (e.g., yelp.com), are also available for users to submit reviews of products and services.

User reviews are representative of a fixed moment in time—that is, they are static in nature. Users typically review products soon after they purchase the product and review services soon after they receive the service. User opinions, however, typically continue to evolve throughout the lifecycle of the product and over the course of the relationship with the service provider. In addition, some products are upgraded to enhance features or otherwise improve the product (e.g., electronics receive upgrades to their internal operating systems, firmware or software).

Some sites allow users to edit their reviews if their opinion changes. These sites, however, do not offer the ability for users to add information to their original review based on ongoing use, while maintaining the original review.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

According to an aspect of the invention, a computer system is provided that includes memory; and a processor in communication with the memory, the processor configured to allow a user to submit a first review of an asset on a website; store the first review of the asset on the website with a user identifier, allow the user to submit a second review of the asset on the website; store the second review with the first review and the user identifier, and generate an opinion timeline for the asset for the user associated with the user identifier.

The second review is based on a change of mind of the user. The second review may be based on an update of the asset.

The processor may be further configured to notify the user of an update to the asset, and request the user provide the second review of the asset based on the update.

The processor may be further configured to analyze the first review and the second review, and recommend another asset to the user based on the first review and the second review.

The asset may be selected from the group consisting of a product, a service and media content.

The processor may be further configured to generate and transmit a request to the user to submit the second review.

According to another aspect of the invention, a computer-implemented method is provided that includes allowing a user to submit a first review of an asset on a website; storing the first review of the asset on the website with a user identifier; allowing the user to submit a second review of the asset on the website; storing the second review with the first review and the user identifier; and generating an opinion timeline for the asset for the user associated with the user identifier.

The second review may be based on a change of mind of the user. The second review may be based on an update of the asset.

The method may also include notifying the user of an update to the asset; and requesting the user provide the second review of the asset based on the update.

The method may also include analyzing the first review and the second review; and recommending another asset to the user based on the first review and the second review.

The asset may be selected from the group consisting of a product, a service and media content.

The method may also include generating and transmitting a request to the user to submit the second review.

According to a further aspect of the invention, a computer-readable storage media is provided having computer executable instructions stored thereon which cause a computer system to carry out the above method when executed.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

FIGS. 5A-5B are schematic views of user interfaces for creating an opinion timeline according to one embodiment of the invention.

FIG. 6 is a schematic diagram of an exemplary computer system according to one embodiment of the invention.

DETAILED DESCRIPTION

Embodiments of the invention are directed to systems and methods that allow users to submit ongoing updates to reviews for various products and services (assets) based on, for example, extended use, new revelations, additional features, and the like. The systems and methods preserve previous reviews and allow the user to make changes as well as add new information to their review. The full review, including both the old review and this edited review, is used to generate an 'opinion timeline'. This opinion timeline allows users to continue adding information to their review based on these changes, providing a way for users to express their changing opinions over time.

These systems and methods may also notify users of updates to assets they have reviewed and ask them to provide additional information based on those updates. Similarly, the systems and methods may also notify users of assets that are similar to assets the user has previously reviewed to generate an opinion timeline that is a 'comparison review'. In effect, these systems and methods allow users to 'change their mind' after they have reviewed an asset based on new information, changes to the asset, or competitive assets.

It will be appreciated that these systems and methods may be used in a variety of contexts in which users submit a review. For example, reviews of products, services, and/or media content may be collected at various stages of a user's interaction with each asset to gain valuable insight into the change of user opinions over time and the factors that most impact this change. That analysis can then be applied to product enhancement, media creation, content recommendations, as well as to improve targeted advertising delivery. When combined with other statistical information such as user demo/psychographics, the opinion timelines can be associated with purchasing and content consumption analyses.

Figure 1:
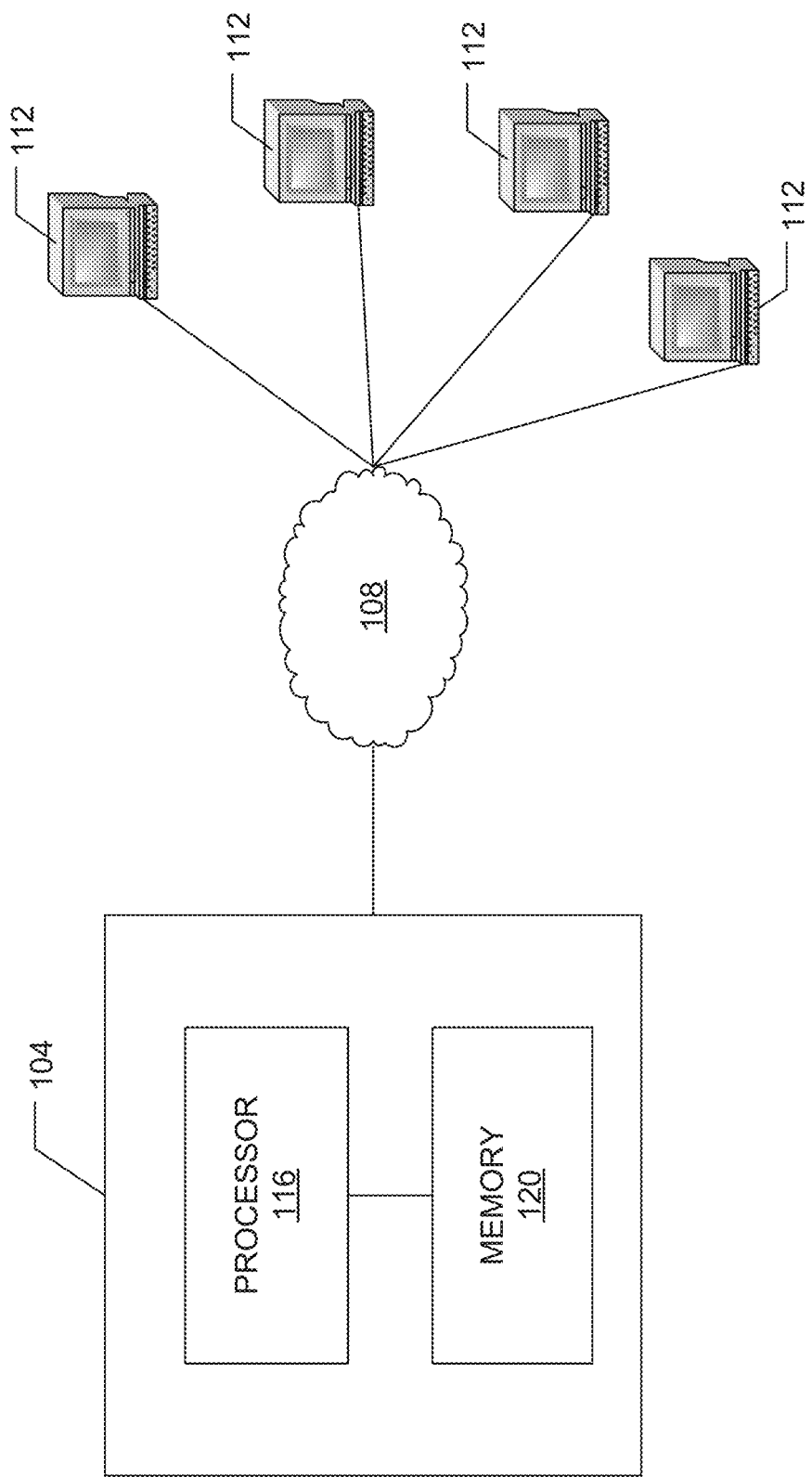
FIG. 1 is a schematic diagram of a system for creating an opinion timeline according to one embodiment of the invention.

An embodiment of the invention will now be described in detail with reference to FIG. 1. FIG. 1 illustrates a server 104 that is connected over a network 108 to a plurality of user systems 112. The server 104 includes a processor 116 and memory 120, which are in communication with one another.

The server 104 is configured to deliver online content to users at the user systems 112. The server 104 is typically a computer system, and may be an HTTP (Hypertext Transfer Protocol) server such as an Apache server. The memory 120 may be any type of storage media that may be volatile or non-volatile memory that includes, for example, read only memory (ROM), random access memory (RAM), magnetic disk storage media, optical storage media, flash memory devices and zip drives.

The network 108 is a local area network (LAN), wide area network (WAN), a telephone network, such as the Public Switched Telephone Network (PSTN), an intranet, the Internet, or combinations thereof. The plurality of user systems 112 may be mainframes, minicomputers, personal computers, laptops, personal digital assistants (PDA), cell phones, and the like. The plurality of user systems 112 are characterized in that they are capable of being connected to the network 108. The plurality of user systems 112 typically include web browsers.

In use, when a user of one of the plurality of user systems 112 is browsing a web page, a request to access content is communicated to the server 104 over the network 108. For example, a signal is transmitted from one of the user systems 112, the signal having a destination address (e.g., address representing the server), a request (e.g., content request) and a return address (e.g., address representing user system that initiated the request). The processor 116 accesses the memory 120 to provide the requested content, which is communicated to the user over the network 108. For example, another signal may be transmitted that includes a destination address corresponding to the return address of the client system, and the content responsive to the request.

Figure 2:
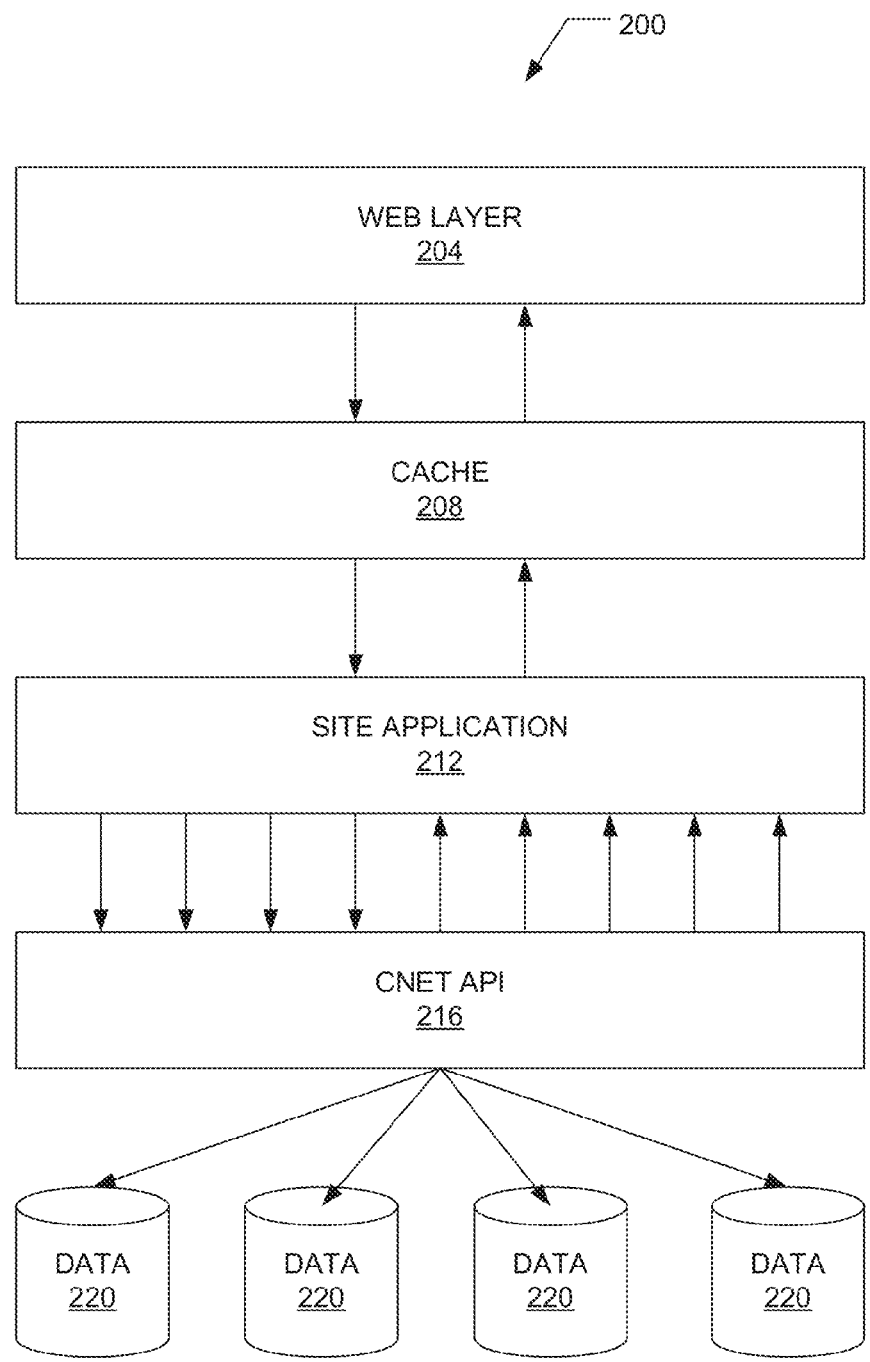
FIG. 2 is a block diagram of an architecture for creating an opinion timeline according to one embodiment of the invention.

FIG. 2 illustrates an exemplary system architecture 200 at the server 104 according to one embodiment of the invention. It will be appreciated that the system architecture may be implemented as one server (e.g., server 104) or a plurality of servers in communication with one another. As shown in FIG. 2, the system architecture 200 includes a web layer 204, a cache 208, a site application 212, a content API (application programming interface) 216 and a plurality of data stores 220. It will be appreciated that the system architecture may vary from the illustrated architecture. For example, the web layer 204 may directly access the data stores 220, the site application may directly access the data stores 220, the system architecture 200 may not include the cache 208, etc., as will be appreciated by those skilled in the art.

The web layer 204 is configured to receive user requests to access content through a web browser and return content that is responsive to the user request. The web layer 204 communicates the user requests to the cache 208. The cache 208 is configured to temporarily store content that is accessed frequently by the web layer 204 and can be rapidly accessed by the web layer 204. In one embodiment, the cache 208 may be a caching proxy server. The cache 208 communicates the user requests to the site application 212.

The site application 212 is configured to update the cache 208 and to process user requests received from the web layer 204. The site application 212 may identify that the user request is for a page that includes data from multiple sources. The site application 212 can then convert the page request into a request for content from multiple sources and transmits these requests to the content API.

The content API 216 is configured to simultaneously access data from the plurality of data stores 220 to collect the data responsive to the plurality of requests from the site application 212. The plurality of data stores 220 include catalogue data about different product types (e.g., product specifications, pricing, images, upgrades, etc.) and other asset types (e.g., television shows, seasons, cast, music artists, albums, songs, release date, etc.). It will be appreciated that in alternative embodiments only one data store 220 may be provided to store the data.

The data in the data stores 220 is provided to the content API 216, which provides the content to the site application 212. The site application 212 updates the cache 208 and delivers the cached content in combination with the accessed content to the web layer 204, which delivers browsable content to the user.

Figure 3:
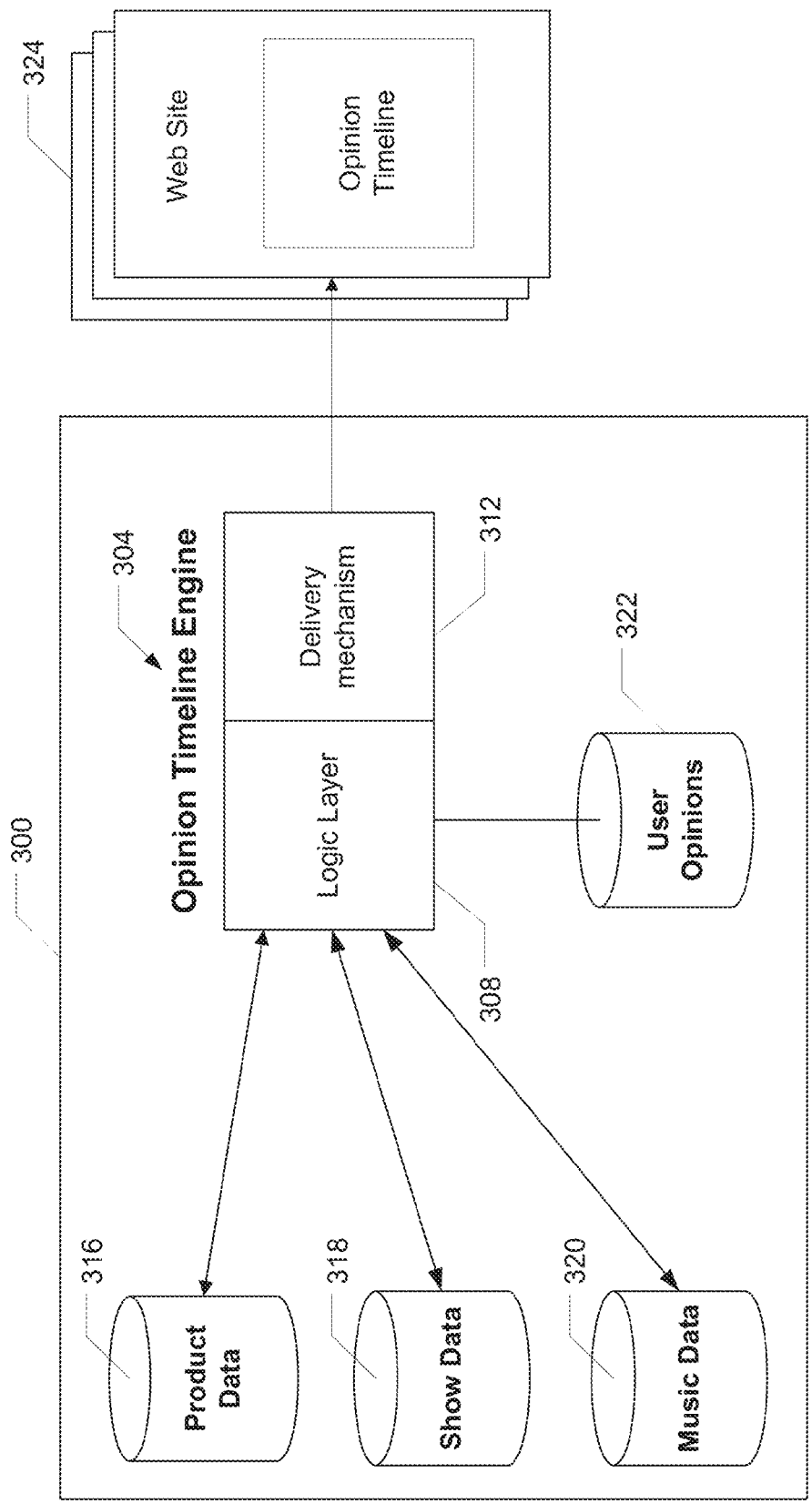
FIG. 3 is a detailed block diagram of an architecture for creating an opinion timeline according to one embodiment of the invention.

FIG. 3 illustrates a detailed system for creating an opinion timeline 300 according to one embodiment of the invention. In FIG. 3, the opinion timeline system 300 includes an opinion timeline engine 304 that includes a logic layer 308 and a delivery mechanism 312. The logic layer 308 is in communication with a product data store 316, a show data store 318, a music data store 320 and a user opinion data store 322. It will be appreciated that the logic layer 308 may be in communication with fewer, additional or different data stores and/or in communication with other services (i.e., other servers or other logic layers). In addition, it will be appreciated that each data store 316-322 may be divided into multiple data stores. A website 324 is in communication with the delivery mechanism 312.

The opinion timeline engine 304 is configured to generate an opinion timeline and allow users to interact with the opinion timeline. In one embodiment, the logic layer 308 is configured to generate the opinion timeline using data in the data stores 316-322 and the delivery mechanism 312 is configured to receive the user reviews from the website 324 and/or deliver the opinion timeline to the users at the website 324.

The product data store 316 is configured to store data about products (e.g., model name, manufacturer, retailers, upgrades, images, etc.). The show data store 318 is configured to store data about television shows (e.g., show name, network, season, cast, episode name, etc.). The music data store 320 is configured to store data about music available online (e.g., artist name, album name, song title, release date, producer, etc.) The user opinion data store 322 is configured to store user reviews. These user reviews may be stored with a user identifier to identify the user that submitted the review and/or an asset identifier to identify the asset (e.g., product, show, music in data stores 316-230) that was reviewed. It will be appreciated that alternatively the reviews may be stored in data stores 316-320 with the asset being reviewed.

In use, a user reviews a first asset and transmits the review to the delivery mechanism 312. The logic layer 308 stores that user review in the user opinion data sore 322. The logic layer 308 may optionally generate a request for an update using information in the data stores 316-320. The user submits another review of the asset (e.g., editing or updating their previous review) and this new review is also stored in the user opinion data store 322 as described above. The logic layer 308 then associates these two user reviews together using the user identification information and/or asset identification information associated with both reviews. The opinion timeline can then be generated by the logic layer 308 and transmitted to the website 324 using the delivery mechanism 312.

As described above, the opinion timeline provides a multi-dimensional view into consumer relationships with products and companies. Each review of an asset offered by a provider affects the overall rating of the provider, both by the individual user and in aggregate.

For example, a user may purchase an Apple IPHONE™ 3G immediately after is released, experiencing problems with dropped calls and accessing the Internet. After much frustration, the user may submit a poor review of the product on CNET Reviews. A few weeks later a software update may be released for the Apple IPHONE™ 3G, which may resolve those problems. The user may receive a notification from CNET about the software update, along with a request to update their review, which the user does. As additional updates are released, the user may continue to add information to the review, creating a feedback loop that can be used for a variety of content and product recommendations. In addition, the individual product review influences the overall user rating for the product manufacturer (e.g., Apple).

In another example, a TV.com viewer may start watching the series "Heroes" and enjoys the entire first season. The user may enthusiastically submit a review of the series on TV.com. The user continues viewing the second and third seasons of the series, but decides eventually that the show is no longer as enjoyable as it was in that first season. The user may submit this information as an update to the previous review that was submitted. Other viewers can read the review and subsequent updates to decide is they want to start viewing Heroes. In addition, the decline in the quality of the series can be mapped against changes in the content division at NBC or other relevant data.

In yet another example, a Last.fm listener may discover the band "The Smashing Pumpkins", listening to several of the early albums and submit glowing reviews of the music. The listener may discover that they do not enjoy the more recent albums, and post a review to that effect. The individual review is applied to the album as well as to the overall band rating for the listener and in aggregate for users who have reviewed The Smashing Pumpkins. In addition, the combination of reviews from different points in time provides a better method for delivering insightful content recommendations to the user.

Figure 4:
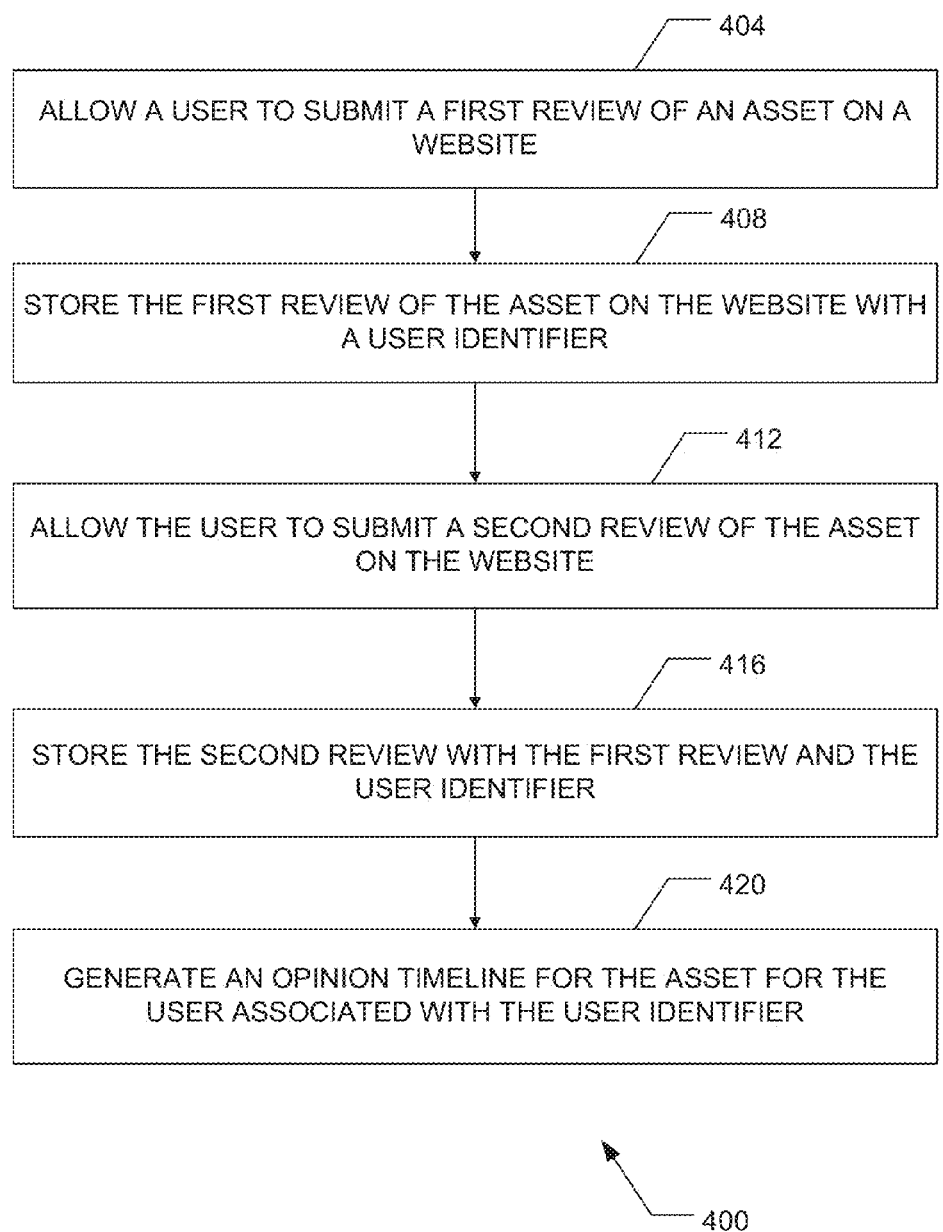
FIG. 4 is a flow diagram of a method of creating an opinion timeline according to one embodiment of the invention.

FIG. 4 illustrates a process 400 for creating an opinion timeline in accordance with one embodiment of the invention. It will be appreciated that the process 400 described below is merely exemplary and may include a fewer or greater number of steps, and that the order of at least some of the steps may vary from that described below.

The process 400 begins by allowing a user to submit a first review of an asset on a website (block 404) and storing the first review of the asset on the website with a user identifier (block 408). For example, the opinion timeline engine 304 may receive a user review of an asset stored in one of data stores 316-320 and stores that user review in the user opinion data store 322.

The process 400 continues by allowing the user to submit a second review of the asset on the website (block 412) and storing the second review with the first review and the user identifier (block 416). For example, the opinion timeline engine 304 may receive a user review related to the first review and stores that user review in the user opinion data store 322. This second review may be an edit of the first review or an addition to the first review. The second review may be based on, for example, a change in opinion over time, a change in opinion based on an update, a comparison of a similar asset, and the like.

The process 400 continues by generating an opinion timeline for the asset for the user associated with the user identifier (block 420). For example, the opinion timeline engine 304 may generate an opinion timeline using the first review and the second review (e.g., by matching the user identifier of the first review with the user identifier of the second review).

It will be appreciated that many additional iterations of the above process may be performed (i.e., each time a user submits a new review or update to the existing review). It will also be appreciated that the process 400 may include additional steps. For example, the process 400 may also generate a request for the user to submit the second review and transmit that request to the user. In another example, the process 400 may aggregate the user reviews and analyze the aggregated user reviews.

Figure 5A:
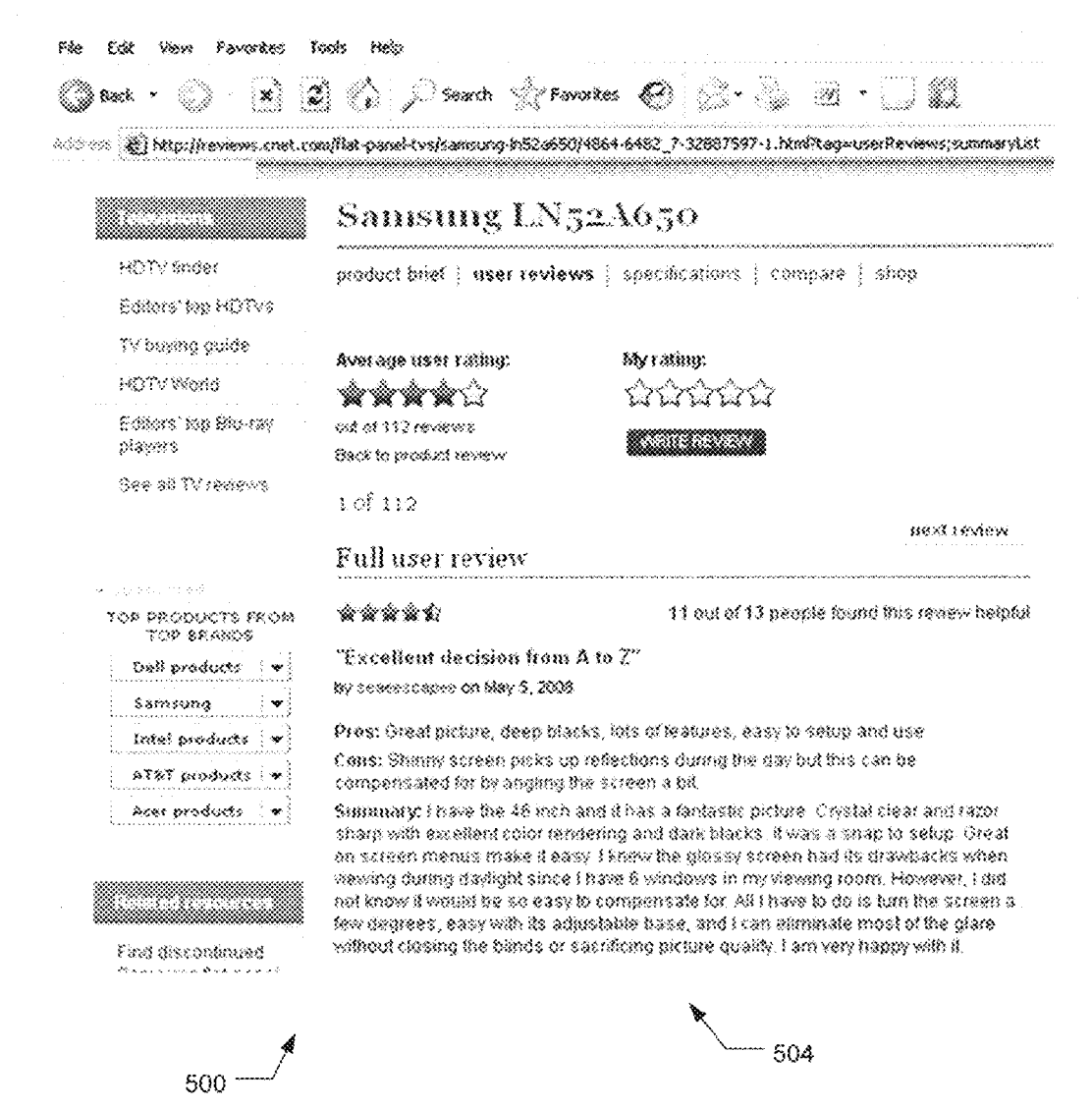
Figure 5B:
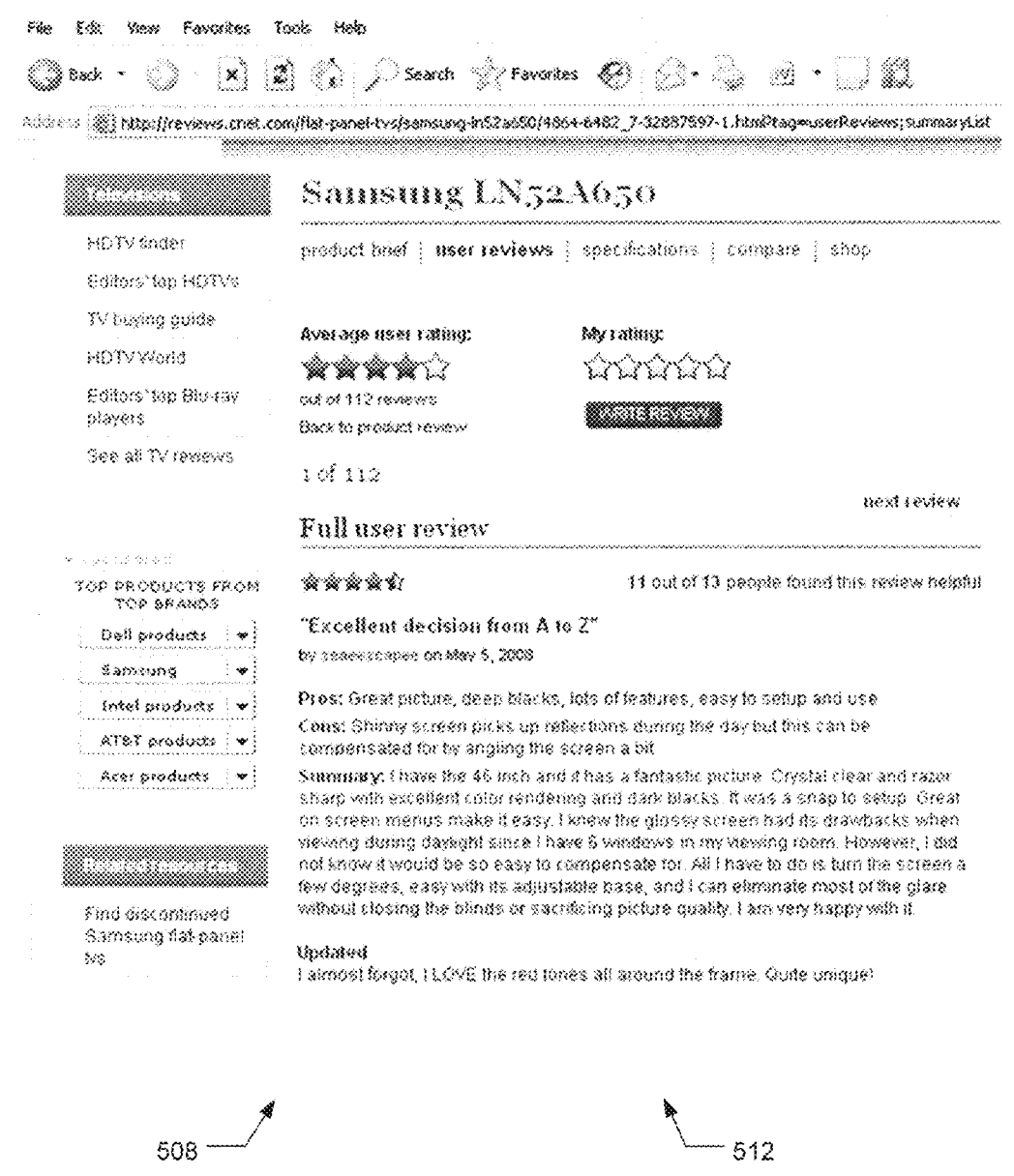

FIGS. 5A-5B illustrate exemplary user interfaces that can be used to create an opinion timeline. As shown in FIG. 5A, an exemplary user interface 500 that includes a user review of a product 504 is shown. As shown in FIG. 5B, an exemplary user interface 508 that illustrates an updated user review of the product 512 is shown. In FIG. 5B, the original user review 504 and the updated user review 508 are shown as an opinion timeline. It will be appreciated that is envisioned that the opinion timeline may have many different configurations and may include additional information that may be relevant to the review (e.g., whether updates have been released between the original review and the updated review, the date each of the reviews were written, etc.).

FIG. 6 shows a diagrammatic representation of machine in the exemplary form of a computer system 600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processor 602 (e.g., a central processing unit (CPU), a graphics processing unit (GPU) or both), a main memory 604 (e.g., read only memory (ROM), flash memory, dynamic random access memory (DRAM) such as synchronous DRAM (SDRAM) or Rambus DRAM (RDRAM), etc.) and a static memory 606 (e.g., flash memory, static random access memory (SRAM), etc.), which communicate with each other via a bus 608.

The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 620 (e.g., a speaker) and a network interface device 622.

The disk drive unit 616 includes a computer-readable medium 624 on which is stored one or more sets of instructions (e.g., software 626) embodying any one or more of the methodologies or functions described herein. The software 626 may also reside, completely or at least partially, within the main memory 604 and/or within the processor 602 during execution thereof by the computer system 600, the main memory 604 and the processor 602 also constituting computer-readable media.

The software 626 may further be transmitted or received over a network 628 via the network interface device 622.

While the computer-readable medium 624 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present invention. The term "computer-readable medium" shall accordingly be taken to include, but not be limited to, solid-state memories, and optical and magnetic media.

It should be noted that the review system is illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a computer-readable medium as above as modules in any manner, and can be used separately or in combination.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention.

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

The invention claimed is:

1. A computer system for generating web content for an asset, the web content including multiple related reviews, the system comprising: one or more processors; and
    a non-transitory computer readable storage medium having instructions stored thereon that, when executed by at least one of the one or more processors, cause at least one of the one or more processors to:
    receive, a first review of the asset, the first review having an associated first asset identifier and an associated first user identifier;
    receive a second review of the asset that does not replace the first review of the asset, the second review having an associated second asset identifier and an associated second user identifier;
    wherein the second review was provided in response to at least one of a solicitation, an update to the asset, a change of opinion by a user associated with the first user identifier, or a combination thereof;
    associate the second review with the first review, based at least in part on a determination that the first asset identifier and the second asset identifier each correspond to the asset and that the first user identifier and the second user identifier correspond to a same user;
    aggregate, the first review and the second review to generate an individual user rating associated with the asset;
    update an overall rating for the asset based on at least the first review and the second review;
    analyze the first and second reviews to create feedback for the user comprising at least one recommendation of another asset;
    transmit the feedback comprising the at least one recommendation of the another asset to the user based on the analysis of the first and second reviews;
    receive a request from a site viewer to access the web content for the asset; and
    in response to the request from the site viewer to access the web content for the asset, generate and transmit the web content for the asset including the first review and the second review, the individual user rating, and the overall rating for display on a display device, wherein:
    the first review and the second review are displayed in a timeline;
    the second review is displayed with an identifier indicating the second review is an update to the first review;
    the timeline includes a first date associated with the first review and a second date associated with the second review; and
    the timeline is updated for one or more iterations of receiving a next review of the asset.

2. The computer system of claim 1, wherein at least one of the one or more memories has further instructions stored thereon that, when executed by at least one of the one or more processors, cause at least one of the one or more processors to:
    notify the user of an update to the asset; and
    transmit a request to the user soliciting the second review, wherein the request instructs the user to provide information based on the update.

3. The computer system of claim 1, wherein the asset is selected from the group consisting of a product, a service, and media content.

4. The computer system of claim 1, wherein the second review is received in response to a request sent to the user.

5. The system of claim 1, wherein at least one of the one or more memories has further instructions stored thereon that, when executed by at least one of the one or more processors, cause at least one of the one or more processors to:
determine a second asset which is similar to the first asset; notify the user of the second asset; and transmit a request to the user soliciting the second review, wherein the request instructs the user to compare the first asset and the second asset.

6. A method for generating web content for an asset, the web content including multiple related reviews, the method comprising:
receiving, by at least one of one or more computing devices, a first review of the asset, the first review having an associated first asset identifier and an associated first user identifier;
receiving, by the at least one of the one or more computing devices, a second review of the asset that does not replace the first review of the asset, the second review having an associated second asset identifier and an associated second user identifier;
wherein the second review was provided in response to at least one of a solicitation, an update to the asset, a change of opinion by a user associated with the first user identifier, or a combination thereof;
associating, by the at least one of the one or more computing devices, the second review with the first review, based at least in part on a determination that the first asset identifier and the second asset identifier each correspond to the asset and that the first user identifier and the second user identifier correspond to a same user;
aggregating the first review and the second review to generate an individual user rating associated with the asset;
updating an overall rating for the asset based on at least the first review and the second review;
analyzing the first and second reviews to create feedback for the user comprising at least one recommendation of another asset;
transmitting the feedback comprising the at least one recommendation of the another asset to the user based on the analysis of the first and second reviews;
receiving a request from a site viewer to access the web content for the asset; and
in response to the request from the site viewer to access the web content for the asset,
transmitting, by the at least one of the one or more computing devices, the web content for the asset including the first review and the second review, the individual user rating, and the overall rating and the second review for display on a display device, wherein:
the first review and the second review are displayed in a timeline;
the second review is displayed with an identifier indicating the second review is an update to the first review;
the timeline includes a first date associated with the first review and a second date associated with the second review; and
the timeline is updated for one or more iterations of receiving a next review of the asset.

7. The method of claim 6, further comprising:
notifying by at least one of the one or more computing devices, the user of an update to the asset; and
transmitting, by at least one of the one or more computing devices, a request to the user soliciting the second review, wherein the request instructs the user to provide information based on the update.

8. The method of claim 6, wherein the asset is selected from the group consisting of a product, a service, and media content.

9. The method of claim 6, wherein the second review is received in response to a request sent to the user.

10. The method of claim 6, wherein the asset is a first asset and further comprising:
determining, by at least one of the one or more computing devices, a second asset which is similar to the first asset;
notifying, by at least one of the one or more computing devices, the user of the second asset; and
transmitting, by at least one of the one or more computing devices, a request to the user soliciting the second review, wherein the request instructs the user to compare the first asset and the second asset.

11. At least one non-transitory computer-readable medium storing computer-readable instructions that, when executed by one or more computing devices, cause at least one of the one or more computing devices to perform operations for generating web content for an asset, the web content including multiple related reviews, the operations comprising:
receiving a first review of the asset, the first review having an associated first asset identifier and an associated first user identifier;
receiving a second review of the asset that does not replace the first review of the asset, the second review having an associated second asset identifier and an associated second user identifier;
wherein the second review was provided in response to at least one of a solicitation, an update to the asset, a change of opinion by a user associated with the first user identifier, or a combination thereof;
associating the second review with the first review, based at least in part on a determination that the first asset identifier and the second asset identifier each correspond to the asset and that the first user identifier and the second user identifier correspond to a same user; and
aggregating the first review and the second review to generate an individual user rating associated with the asset;
updating an overall rating for the asset based on at least the first review and the second review;
analyzing the first and second reviews to create feedback for the user comprising at least a recommendation of another asset;
transmitting the feedback comprising the at least one recommendation of the another asset to the user based on the analysis of the first and second reviews;
receiving a request from a site viewer to access the web content for the asset; and
in response to the request from the site viewer to access the web content for the asset,
transmitting the web content for the asset including the first review and the second review, the individual user rating, and the overall rating and the second review for display on a display device, wherein:
the first review and the second review are displayed in a timeline;
the second review is displayed with an identifier indicating the second review is an update to the first review;
the timeline includes a first date associated with the first review and a second date associated with the second review; and the timeline is updated for one or more iterations of receiving a next review of the asset.

12. The at least one non-transitory computer-readable storage media of claim 11, further comprising additional instructions that, when executed by one or more computing devices, cause at least one of the one or more computing devices to:
   notify the user of an update to the asset; and
   transmit a request to the user soliciting the second review, wherein the request instructs the user to provide information based on the update.

13. The at least one non-transitory computer-readable storage media of claim 11, wherein the second review is received in response to a request sent to the user.

14. The at least one non-transitory computer-readable storage media of claim 11, further comprising additional instructions that, when executed by one or more computing devices, cause at least one of the one or more computing devices to:
   determine a second asset which is similar to the first asset;
   notify the user of the second asset; and
   transmit a request to the user soliciting the second review, wherein the request instructs the user to compare the first asset and the second asset.

\* \* \* \* \*